(12) United States Patent
Vierimaa

(10) Patent No.: US 11,777,617 B2
(45) Date of Patent: Oct. 3, 2023

(54) TESTING OF RADIO EQUIPMENT

(71) Applicant: Siemens Industry Software Inc., Plano, TX (US)

(72) Inventor: Kari Vierimaa, Kempele (FI)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 18/021,966

(22) PCT Filed: Aug. 31, 2020

(86) PCT No.: PCT/US2020/048713
§ 371 (c)(1),
(2) Date: Feb. 17, 2023

(87) PCT Pub. No.: WO2022/046097
PCT Pub. Date: Mar. 3, 2022

(65) Prior Publication Data
US 2023/0231633 A1    Jul. 20, 2023

(51) Int. Cl.
*H04B 17/00* (2015.01)
*H04B 7/08* (2006.01)
*H04B 7/0452* (2017.01)
*H04B 7/06* (2006.01)

(52) U.S. Cl.
CPC ....... *H04B 17/0087* (2013.01); *H04B 7/0452* (2013.01); *H04B 7/0617* (2013.01); *H04B 7/088* (2013.01)

(58) Field of Classification Search
CPC .............. H04B 17/0087; H04B 7/0452; H04B 7/0617; H04B 7/088

USPC ...................................................... 455/67.11
See application file for complete search history.

(56) References Cited

U.S. PATENT DOCUMENTS

| 8,964,791 | B2 | 2/2015 | Vu et al. | |
| 10,103,823 | B1 | 10/2018 | Kyrolainen et al. | |
| 11,166,271 | B2 * | 11/2021 | Jeon | H04B 7/0695 |
| 11,582,754 | B2 * | 2/2023 | Huh | H04W 76/10 |

(Continued)

FOREIGN PATENT DOCUMENTS

EP    3637826 A1    4/2020

OTHER PUBLICATIONS

Ma, Wenyan, Chenhao Qi, and Geoffrey Ye Li. "Machine learning for beam alignment in millimeter wave massive MIMO." IEEE Wireless Communications Letters 9.6 (2020): 875-878.

(Continued)

*Primary Examiner* — Juan A Torres
(74) *Attorney, Agent, or Firm* — Lempia Summerfield Katz LLC

(57) ABSTRACT

A method is provided for generating test data for testing radio equipment. The method includes: determining, by a test apparatus, one or more beam identifiers; selecting, by the test apparatus, based on the one or more beam identifiers, one or more radio channel models; receiving, by the test apparatus, a baseband signal representing I/Q data of one or more beamforming antennas; processing, by the test apparatus, the baseband signal representing I/Q data according to the selected radio channel model; and transmitting, by the test apparatus, the processed baseband signal representing I/Q data to a radio equipment under test.

23 Claims, 5 Drawing Sheets

(56) References Cited

U.S. PATENT DOCUMENTS

2021/0345142 A1* 11/2021 Vierimaa .............. H04W 24/00
2022/0078643 A1* 3/2022 Vierimaa .............. H04B 17/15

OTHER PUBLICATIONS

PCT International Search Report and Written Opinion of International Searching Authority dated Apr. 28, 2021 corresponding to PCT International Application No. PCT/US2020/048713.

* cited by examiner

TESTING OF RADIO EQUIPMENT

The present patent document is a § 371 nationalization of PCT Application Serial No. PCT/US2020/048713, filed Aug. 31, 2020, designating the United States, which is hereby incorporated by reference.

TECHNICAL FIELD

The present disclosure relates to radio equipment and testing of radio equipment, as well as a test apparatus for generating test data.

BACKGROUND

In wireless systems, such as multiple input multiple output (MIMO) wireless systems, for example, multiple antennas are used on both the base station and on the mobile device to exploit a phenomenon known as multipath propagation in order to achieve higher data rates. Wireless systems, such as MIMO systems, may simultaneously send and receive multiple data signals over each radio channel. The multipath propagation phenomenon is the result of environmental factors that influence the data signals as they travel between the base station and the mobile device, including, for example, ionospheric reflection and refraction, atmospheric ducting, reflection from terrestrial objects, and reflection from bodies of water. Because of these factors, the data signals experience multipath interference that results in constructive interference, destructive interference, or fading, and phase shifting of the data signals. MIMO technology has been standardized in various wireless communications standards including Institute of Electrical and Electronics Engineers (IEEE) 802.11n, IEEE 802.11ac, HSPA+(3G), WiMAX (4G), and Long Term Evolution (LTE) standards.

Base stations and mobile devices of wireless systems require testing. A test system for testing radio equipment may include a distributed unit (DU), a test apparatus, a radio unit, user equipment (UE), and various electrical cables for interconnecting the components.

The latest generation of wireless systems is the 5th generation wireless system, commonly abbreviated as "5G." It is expected that 5G wireless systems that operate in the millimeter wave spectrum (mmWave), which is between 30 GHz and 300 GHz, will employ beamforming with fast dynamic beam switching in both the distributed unit (DU) and the user equipment (UE).

SUMMARY

The scope of the present disclosure is defined solely by the appended claims and is not affected to any degree by the statements within this summary. The present embodiments may obviate one or more of the drawbacks or limitations in the related art.

Today it is not possible to make a reasonable test system for testing dynamic beamforming schedules. The data amount per second is massive. For example, between 3.125 GB/s to 100 GB/s, or even 1 TB/s in massive 5G/6G Radios. In addition, beams and adaptive beam control generate new challenges to test the coming 5G or even 6G systems. Beamforming and algorithm testing require a high number of signal paths (multipath, multiuser), for example, up to 3000 signal paths. With the current channel modelling technology, it is not reasonable to emulate that amount of signal paths in real-time. Furthermore, the known channel models for testing are simple and support traditional test methodology only. Radio equipment manufacturers are looking for more real word like models, in particular including multiuser and moving user scenarios. These are major features missing in the current channel models and test methodologies.

5G NR specifies beamforming functionality that changes massive MIMO parameters depending on the beam used. In addition, a channel model test apparatus may not know which beam exactly is currently in use. It is beneficial that each beam has its own channel model for fading.

Radio equipment manufacturers are developing new algorithms to control the operation of the radio equipment, such as the beamforming schedule, by machine learning (ML) or artificial intelligence (AI). To that end, the algorithms for determining the beamforming schedule need realistic learning data. Radio equipment manufacturers will apply machine learning models to millimeter-wavelength installations. In such installations, every environment is different, and the machine learning model needs to learn the installation environment and the respective radio channels for selecting an optimal beam and/or an optimal beamforming schedule.

It is an object to improve the known testing methods and provide a solution to the challenges described.

The object is achieved by the following aspects.

According to a first aspect, a method of generating test data for testing radio equipment is proposed. The method includes determining, by a test apparatus, one or more beam identifiers. The method further includes selecting, by the test apparatus, based on the one or more beam identifiers one or more radio channel models. The method further includes receiving, by the test apparatus, a baseband signal representing I/Q data of one or more beamforming antennas. The method further includes processing, by the test apparatus, the baseband signal representing I/Q data according to the selected radio channel model. The method further includes transmitting, by the test apparatus, the processed baseband signal representing I/Q data to a radio equipment under test.

According to a second aspect, a test apparatus for generating test data for testing radio equipment is proposed. The test apparatus, (e.g., including a processor and a memory), is operative to perform any one of the method acts of first aspect.

According to a third aspect, a test apparatus for generating test data for testing radio equipment is proposed. The test apparatus is configured to determine one or more beam identifiers and to select one or more radio channel models based on the one or more beam identifiers. The test apparatus is further configured to receive a baseband signal representing I/Q data of one or more beamforming antennas. The test apparatus is configured to process the baseband signal representing I/Q data according to the selected radio channel model. The test apparatus is further configured to transmit the processed baseband signal representing I/Q data to a radio equipment under test. A radio equipment may be any one of or combination of a DU, RU, and/or UE.

According to a fourth aspect, a system includes a test apparatus according to the second or third aspect and a radio equipment. The radio equipment operates based on a machine learning model, and the processed baseband signal representing I/Q data serves for training the machine learning model of the radio equipment.

DETAILED DESCRIPTION

Figure 1:
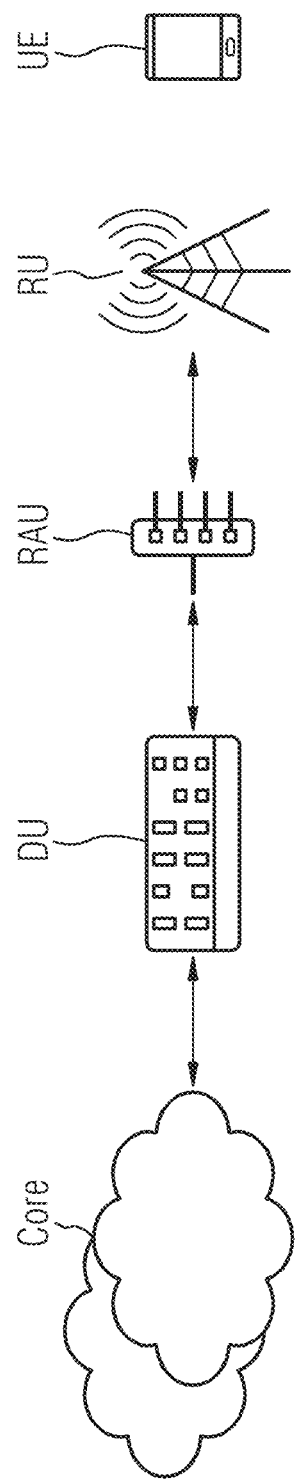
FIG. 1 depicts an example of a radio communication system.

In FIG. 1, a radio communication system is illustrated. The traditional monolithic base transceiver station (BTS) architecture is increasingly being replaced by a distributed BTS architecture in which the functions of the BTS are separated into two physically separate units: a distributed unit (DU) and a radio unit (RU). The DU performs baseband processing for the particular air interface that is being used to wirelessly communicate over one or more radio channels. The RU performs radio processing to convert baseband data output from the DU to radio signals for radiating from one or more antennas coupled to the RU and/or to produce baseband data for the DU from radio frequency signals that are received at the RU via one or more antennas. The RU may be installed near the one or more antennas, e.g., at the top of a tower, and the DU may be installed in a more accessible location, e.g., at the bottom of the tower. Alternatively, the DU and RU may be collocated, e.g., in a lab. The DU and the RU may be connected through one or more fiber optic links. The interface between the DU and the RU is defined by fronthaul communication link standards such as the Common Public Radio Interface (CPRI) family of specifications, the Open Base Station Architecture Initiative (OBSAI) family of specifications, and the Open Radio Interface (ORI) family of specifications.

In the 5G architecture, a new frequency domain fronthaul interface will be specified. The frequency domain fronthaul is a functional split where the Inverse Fast Fourier Transform/Fast Fourier Transform (IFFT/FFT) may be moved from the DU to the RU. Frequency domain samples instead of time domain samples are sent over the fronthaul. The RU will have information through a communication channel about the resource allocation for different UEs. The new eCPRI interface specification "eCPRI Specification V1.0 (2017 Aug. 22)" is already available.

For the deployment scenario where the remote radio head (RU), sometimes also denoted as radio equipment (RE), and the baseband unit (DU), sometimes denoted as radio equipment controller (REC), are separated, the signals received from one or more antennas have to be transported over the media that is connecting the RU with the DU as normally the signal combination is done at the DU. The interface used for the connection between the DU and the RU may be referred to as the fronthaul. The signals over the fronthaul may be complex time domain samples such as specified in the legacy Common Public Radio Interface, CPRI. Digitized waveforms may be transported over the fronthaul from the DU to the RU, and vice versa, via one or more radio aggregation units (RAU).

The user equipment's (UE) signals are power limited and as the path loss varies with the distance to the UE a large dynamic range is encountered when those signals are represented digitally, it may be assumed that for the complex frequency sample a large number of bits will be required and in the case of Multiple Input Multiple Output (MIMO)/diversity layers the required fronthaul capacity will multiply with the number of antennas. Furthermore, it is desired to model such propagation of radio signals in order to test the functionality of the radio system and its components. As the capacity on the fronthaul is limited, it is desired to find methods that optimize the usage of the fronthaul.

The DU may be connected to a core network (Core) and possibly to other DUs (not shown) via one or more backhaul or crosshaul connections.

Figure 2:
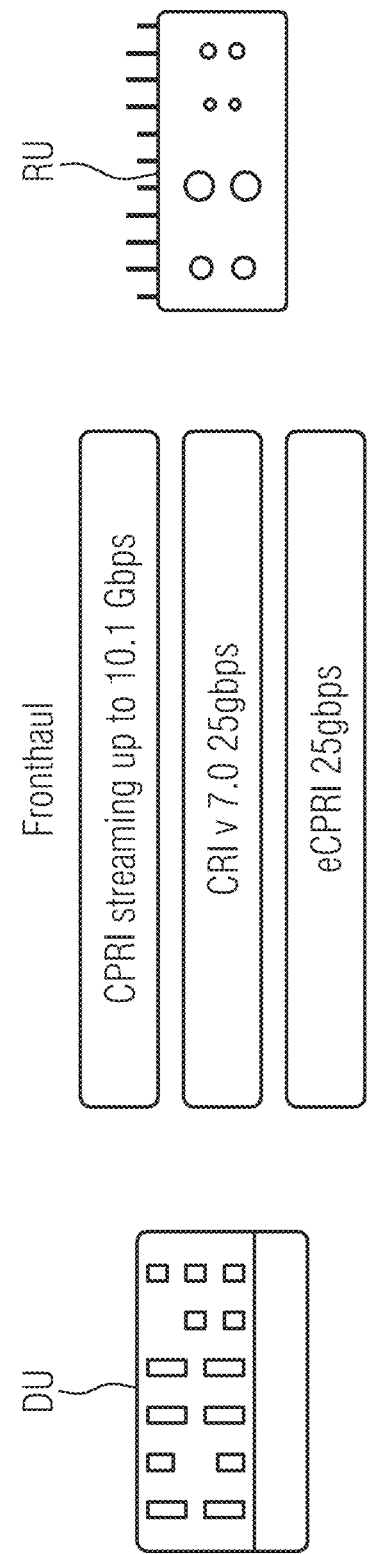
FIG. 2 depicts an example of a fronthaul data transmission using different protocols.

In FIG. 2, fronthaul data transmission using different protocols is illustrated. As mentioned, the different protocols employed have different bandwidth capacities. Hence, the CPRI streaming supports up to 10.1 GB/s, whereas CPRI v7.0 supports 25 GB/s, and eCPRI supports up to 25 GB/s, e.g., between the RRH and the BBU.

In-phase and quadrature components (I/Q) data is digitalized air-interface data. The sample rate is in 5G is 122.88 MHz. Thus, e.g., in case of multiple radio channels, a high amount of data needs to be transmitted via the fronthaul. IQ data transmission may occur in uplink and downlink direction for each radio channel.

Figure 3:
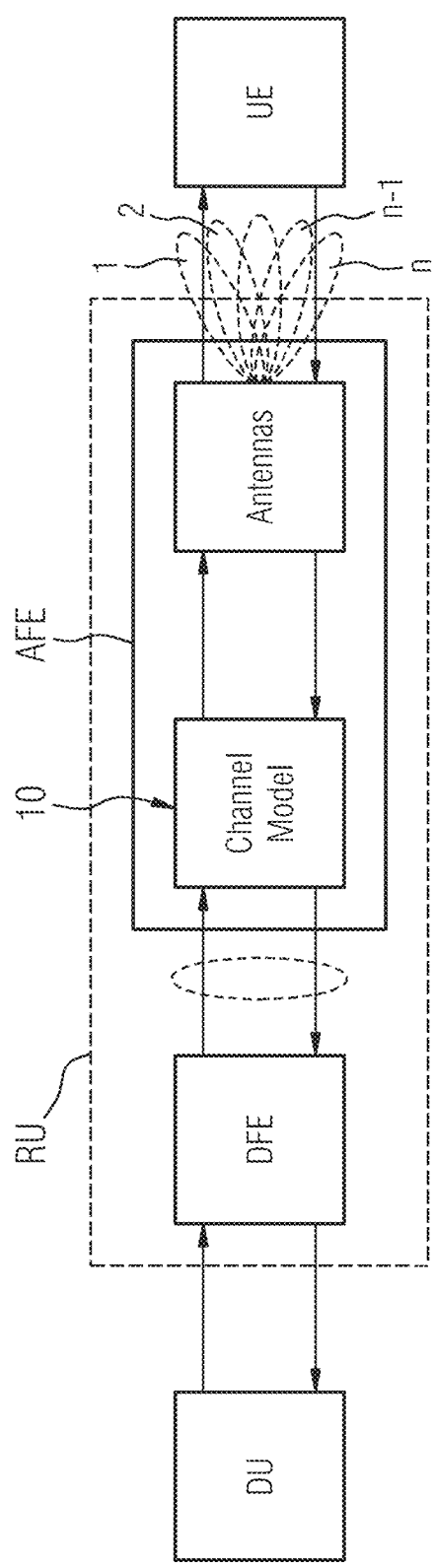
FIG. 3 depicts an example of test system including a radio channel test apparatus.

In order to improve data transmission, a functional split between the components of the DU and the RU may be introduced. Such a functional split is illustrated in FIG. 3. The concept of a functional split is, e.g., described in section 2.3 of eCPRI Specification V1.0 (2017 Aug. 22). According to this, a radio base station is divided into two nodes, one called Radio Equipment Control (REC), (e.g., the DU), and the other called Radio Equipment (RE), (e.g., the RU). The 'Fronthaul Network' may thus be understood as the interface between the REC and RE. The different functions of the base station, e.g., as listed in Table 1 of eCPRI Specification V1.0 (2017 Aug. 22), may be located either in the REC or in the RE, that is to say DU or RU, respectively.

Functional split may be summarized as determining how much data is processed in different components, e.g., different parts of an eNodeB/or gNodeB. For example, in CPRI the IQ data may be in the time domain, but may be in the frequency domain, e.g., when FFT processing is made to IQ samples. Such processing reduces the amount of data for transmission via the fronthaul link. Data may be processed, (e.g., according to one or more radio channel models), in the frequency domain, or data may be transformed to the time domain and processing may be performed in the time domain.

In FIG. 3, a testing environment for testing radio equipment is illustrated. FIG. 3 illustrates a block diagram of a test system for testing 5G DU, RU, and UE. The test system includes a DU, a RU, a test apparatus, and a UE, which, for exemplary purposes, is assumed to be a 5G mobile device, such as a 5G smart phone, for example. Either the DU, RU, and/or UE may be the device under test (DUT). The DU has a baseband unit that generates radio frames that are made up of OFDM symbols. The baseband unit may include a logic that maps one or more beam indices to OFDM symbols within each radio frame. The structure of the radio frame that is used may be implementation dependent. The RU may include a digital-to-analog converter (DAC). The DAC converts digital baseband signal output from the baseband unit. A test apparatus 10 may be installed between the RU and its antennas. A similar setup is shown in U.S. Pat. No. 10,103,823 B1, where a test system is proposed for testing base stations (BSs) and user equipment (UE) that includes a radio channel (RC) emulator having a dynamically-variable channel model. Therein, however, analog beamforming is used.

In FIG. 3, an analog front end (AFE) and a digital front end (DFE) are shown. An analog front end (AFE) is a term for all the circuitry between a receiver's antenna input up to and including the mixer stage. The AFE may include an analog-to-digital converter that transforms the signals received into digital signals, and vice versa.

A digital front end (DFE) takes the baseband signals (representing IQ data) as input and performs up/downsampling, signal processing, and translates the processing streams in the digital domain. The DFE may thus take fronthaul protocol as input and JESD204B as output, and vice versa. DFE may perform signal processing in the transmit path (TX) and the receive path (RX). On the transmit side, DFE aggregates multiple real or complex digital data channels into signal streams. On the receive side, DFE receives JESD204B-formatted signal streams containing time-division multiplexed data for multiple ADC channels and separates them into individual real or complex data channels. The DFE is thus an interface between AFE and the digital baseband.

Thereby, a reconfiguration of the channels in the RU is possible in real time, thus allowing for the implementation of various signal conditioning, compensation, and mitigation a channel's (non-linear) responses. Thus, received radio signals may be digitally processed by a digital front end (DFE) processor, e.g., with a programmable receive signal processing path for each receive antenna. Each receive signal path is formed, e.g., with a receive signal processor and an associated serialized interface and RF transceiver/receive front end that is connected to a receive antenna or even multiple antennas. The receive signal processor may include one or more processors (e.g., vector processors) and associated memory (e.g., RAM) for performing receive signal processing on IQ data samples received from the front end over a receive interface, e.g., one of the JESD receive interface.

To facilitate transfer of received signal information between the receiver front end and DFE, the transceiver/receiver front end may include a serialized interface (e.g., JESD204B TX 261) for transfer to the received signal information over IQ data signal lines. At the DFE, the signal information is received at a corresponding serialized interface (e.g., JESD204B RX). Once receive signal processing of the signals received over IQ signal lines is completed, the receive signal processor may send the processed samples to the baseband modem, e.g., as by using an (e)CPRI interface module. In this way, separate receive signal paths may be formed for each of the receive antennas. Such a setup is, for example, described in U.S. Pat. No. 8,964,791 B2. Therein analog beamforming is performed. Analog beamforming makes use of attenuators and phase shifters as part of the analog RF circuit, (e.g., AFE), where a single data stream is divided into separate paths. The advantage of this method is that only one RF chain (PA, LNA, filters, switch/circulator) is required. The disadvantage is the loss from the cascaded phase shifters at high power.

Figure 4:
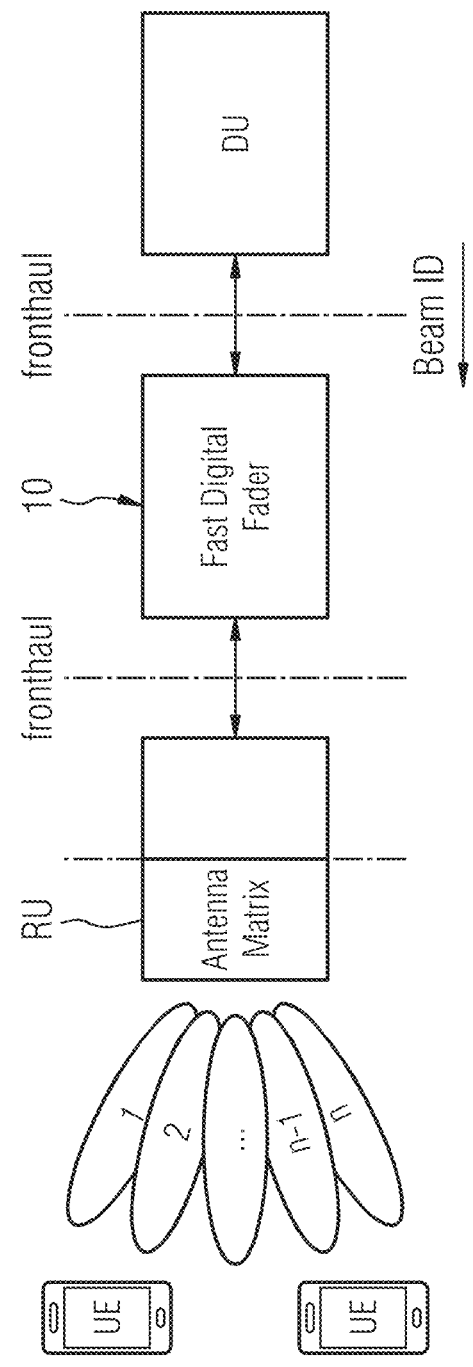
FIG. 4 depicts an example of a test system including a test apparatus.

In FIG. 4, a test system is shown wherein the channel models are applied in the fronthaul by processing the IQ data transmitted over the fronthaul between the DU and RU. The system shown performs digital beamforming. As a special MIMO technique, beamforming permits targeted transmission to/from specific areas, making it possible to improve transmission to one or more UEs, e.g., at the far reaches of cell coverage.

Beamforming may be applied to the time division duplex (TDD) mode. A MIMO system may include m transmit antennas, (e.g., at the RU), and n receive antennas, (e.g., at one or more of the UEs). The receiver receives a signal y that results when the input signal vector x is multiplied by the transmission matrix H. Transmission matrix H contains the channel impulse responses, which reference the channel between the transmit antenna m and the receive antenna n. Spatial multiplexing (beamforming) increases the data rate. Data is divided into separate streams, which are then transmitted simultaneously over the same air interface resources. When the individual streams are assigned to various UEs, this is called Multi-User MIMO (MU-MIMO). Beamforming uses multiple antennas to control the direction of a wavefront by appropriately weighting the magnitude and phase of individual antenna signals. Adaptive beamforming refers to the technique of continually applying beamforming to a moving receiver. This requires rapid signal processing and powerful algorithms.

For example, the DU may control usage of beams 1, 2, . . . , n−1, n by transmitting a beam identifier, such as a beam index, via the fronthaul protocol to the RU. On the other hand, the one or more UEs may select a respective beam index and feed back that index to the DU. The test apparatus 10 between the RU and the DU may read the fronthaul communication and select a channel model based on the beam identifier transmitted from the DU. Multiple beams may be transmitted/received from/by the RU and the DU or UE may transmit more than one beam identifier. As mentioned, multiple UEs may send their respectively selected beam identifier, such as the beam index, to the DU. Correspondingly, the test apparatus applies a respective channel model to each of the IQ data streams transmitted over the fronthaul. The IQ data (stream) transmitted over the fronthaul may correspond to antenna carrier streams AxC1, AxC2, . . . AxCn—to each of which a separate channel model is applied. Hence, it is proposed to apply channel models to digital baseband beamforming.

Figure 5:
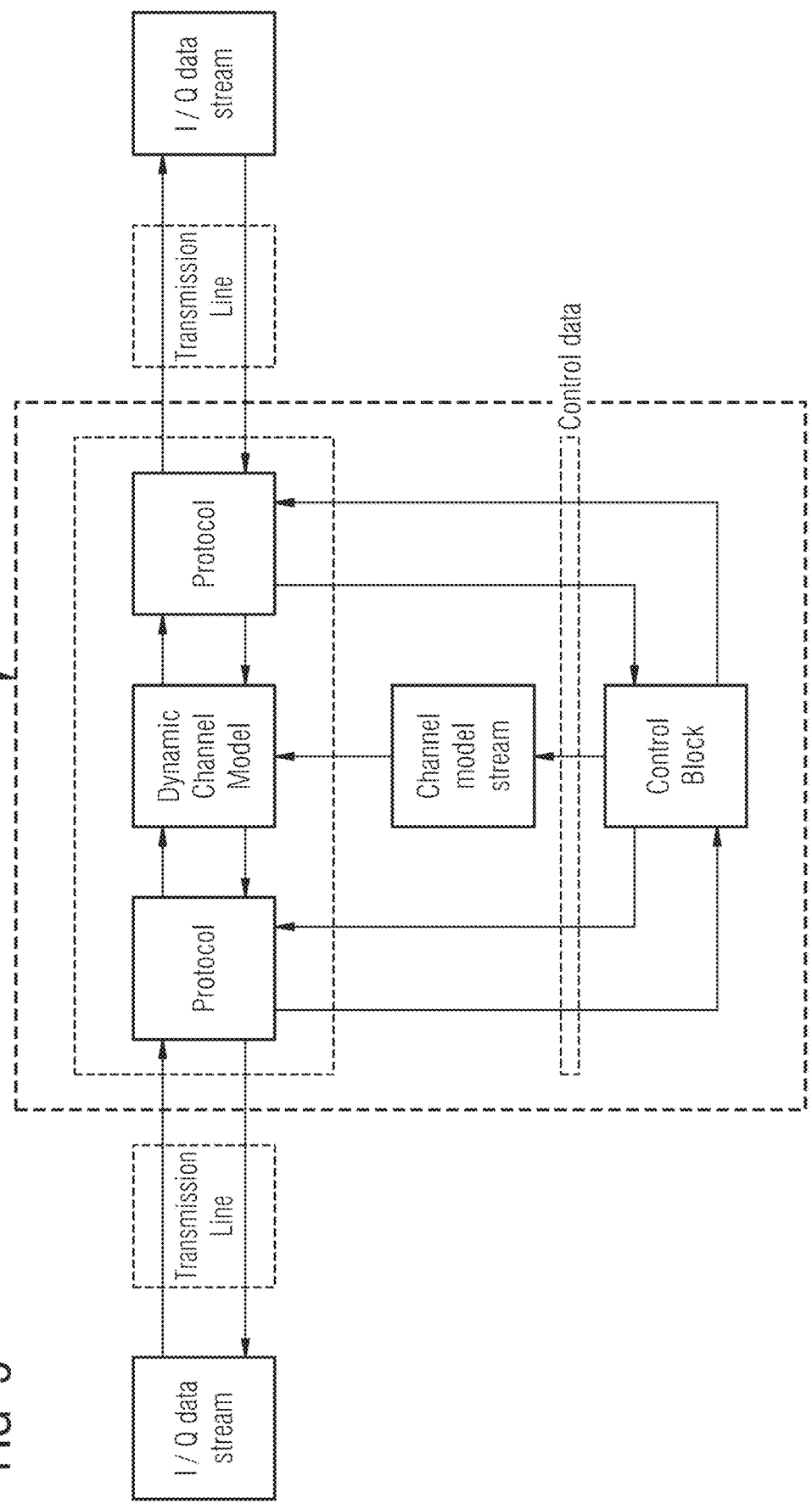
FIG. 5 depicts an embodiment of a test apparatus.

Turning to FIG. 5, a test system including a test apparatus 10 is shown. As shown the test apparatus 10 may receive an IQ data, for example, an IQ data stream, and may, after processing the received IQ data stream, output the processed IQ data via one or more transmission lines, again in the form of an IQ data stream. By way of the processing, digital beamforming in the baseband is performed. To that end, the test apparatus may process a first protocol by which the IQ data stream is received and output the processed IQ data stream via a second protocol. As will be shown later, the first and the second protocol may coincide or may be different protocols. The test apparatus 10 may implement one or more channel models, wherein by the one or more channel models (fast) fading is modelled in the digital domain by processing the IQ data transmitted over the fronthaul.

Hence, the test apparatus 10 is capable of receiving fronthaul communication. Ethernet may be selected as a transport protocol, and all radio application data is conveyed within the Ethernet Payload. The radio transport header is used to convey some radio-specific transport information, while the radio transport payload carries the C-Plane & U-Plane information. An enhanced Common Public Radio Interface (eCPRI) may be chosen as the radio transport protocol. C-Plane messages are thus encapsulated using a two-layered header approach. The first layer includes an eCPRI standard header, including corresponding fields used to indicate the message type, while the second layer is an application layer including necessary fields for control and synchronization. Within the application layer, a "section"

defines the characteristics of U-plane data to be transferred or received from a beam with one pattern id.

The test apparatus 10 may be configured to monitor the fronthaul communication, in particular control plane messages. For example, the test apparatus may monitor the eCPRI payload of one or more control plane (C-Plane) messages from the DU. The test apparatus may then extract one or more beam identifiers. The test apparatus is thus capable of identifying a beam identifier based on the fronthaul communication monitored.

eCPRI message type-2 includes control plane information in the form of C-plane messages. The C-Plane message may carry information about the one or more beams used. Hence, the test apparatus is capable of identifying a beam identifier. The beam identifier may be a beam index, also denoted as beamID, as transmitted via the fronthaul protocol, or may be deduced from the beamforming weights used for the IQ data. Furthermore, a beam may be identified based on the C-plane message of "sectionType=6" of the O-RAN fronthaul specification, which carries information about the IQ data and the one or more antennas for which the IQ data is destined.

The test apparatus 10 is then capable of selecting a channel model for that beam. To that end, a control block may be provided that determines the beam identifier and selects a corresponding channel model. The channel model is then applied to the IQ data of the IQ data stream of the beamforming antenna.

A channel model is a (test-)model for the behavior of one or more radio signals transmitted over the air interface. This channel model enables testing radio equipment in lab environments or even on-site. For example, a channel model test apparatus 10 may be used that performs the processing of the radio frequency signals, e.g., in the form of I/Q data, according to one or more channel models. The technical specification TR 38.901 describes different CDL channel profiles.

The channel model may be changed in case the beam identifier—as transmitted via the fronthaul-changes. Thus, the test apparatus 10 may continuously monitor the fronthaul protocol/communication. A change in the channel model may then be affected when a new beam identifier has been determined on the fronthaul communication. The new channel model may reflect the changing scattering, diffraction of the new beam. Thus, a new channel model may be chosen based on the (expected) properties of the new beam.

In scenarios with a moving receiver, (e.g., a UE), the channel properties may change dynamically or fast, and the channel model may need to be adapted dynamically. Therefore, in order to reflect the changing channel properties, the channel model is a dynamic channel model that is transformed continuously, such as by continuously adapting the channel model parameters, e.g., by interpolating one or more impulse responses of the one or more beams corresponding to the beam identifier. As may be seen in FIG. 4, a channel model stream is provided that continuously updates the channel model according to which the IQ data is processed. Different channel model streams may be selected for different beams, (e.g., when different beam identifiers are determined on the fronthaul).

The IQ data processed according the radio channel model is then encapsulated again in the transport protocol, e.g., for transmission over the transmission line(s), for example, of the fronthaul network. As shown, protocol information belonging to the IQ data is read in the receiving interface and applied again to the transmission of the IQ data via the transmitting interface.

The processed IQ data may then be transmitted to a device under test (DUT). Alternatively, the processed IQ data may serve for training a machine learning model.

Figure 6:
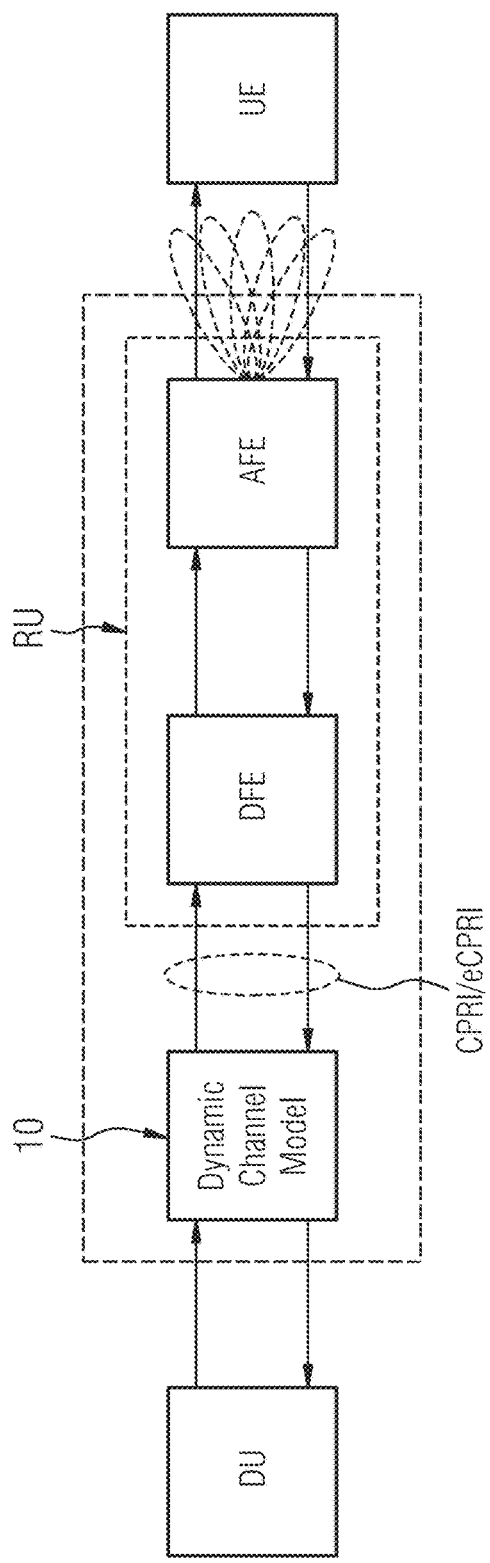
FIG. 6 depicts another embodiment of a test system including a test apparatus.

FIG. 6 shows an embodiment of a test system. The test system includes a DU, a RU, a test apparatus 10, and a UE. The test apparatus 10 may be operatively connected to the DU and the RU via a fronthaul network. That is to say, the test apparatus 10 is inserted in the fronthaul network. Baseband signals representing I/Q data may be exchanged between the DU and the RU via the test apparatus. As the case may be multiple Rus may be connected to the DU via the fronthaul (network).

At the same time, channel models may be applied to the I/Q data, (e.g., processing the I/Q data), and thereby modeling the behavior of radio signal propagation between the RU and the UE. The test apparatus may apply different channel models for different beams, e.g., different channel models are applied to the IQ/data of the one or more beamforming antennas. The antennas are not shown in FIG. 5. Digital beamforming assumes there is a separate RF chain for each antenna (element). The beam is then formed by matrix-type operations in the baseband where the amplitude and phase weighting are applied. For frequencies lower than 6 GHz, this is an exemplary method because the RF chain components are comparatively inexpensive and may combine MIMO and beamforming into a single array. Hybrid beamforming combines digital and analog beamforming in order to allow the flexibility of MIMO and beamforming while reducing the cost and losses of the beamforming unit. Each data stream has its own separate analog beamforming unit with a set of antennas. If there are data streams, then there are antennas. The analog beamforming unit loss due to phase shifters may be mitigated by replacing the adaptive phase shifters with a selective beamformer such as a Butler matrix. Some architectures use the digital beamforming unit to steer the direction of the main beam while the analog beamforming unit steers the beam within the digital envelop.

Now, in the case of multiple RUs connected to a DU, a UE may be connected through multiple TRPs (Tx/Rx Point), (e.g., multiple RUs), and one or more beams for each TRP to the radio communication network. In that case, separate channel models may be applied for the IQ data of the respective beams via which the UE is connected using the test apparatus 10.

All connections, (e.g., between the DU, RU, and/or the test apparatus, and/or the UE), may be made by coaxial cables and/or optical cables. However, other kinds of cables serving as transmission line(s) may be chosen. Channel modeling for individual beams is thus provided for within the fronthaul network. The channel modeling of the radio signal propagation is performed in the fronthaul network, e.g. by way of a radio channel test apparatus 10. That is to say, propagation of radio signals via the air interface according to one or more radio channel models is modeled, e.g., by way of said test apparatus. The UE may be collocated with at least part of the RU and/or its antennas in a test chamber in which radio signals are exchanged between the RU and the UE. The channel modeling of the radio signal propagation is performed in the fronthaul network, e.g., by way of a radio channel test apparatus. That is to say, propagation of radio signals via the air interface according to one or more radio channel models is modeled, e.g., by way of said test apparatus.

In digital baseband beamforming, a Field-Programmable Gate Array (FPGA) may be used to implement the phase shift digitally. In analog baseband beamforming (ABBF), the phase shift is implemented using a simple analogue circuit for each element. The FPGA is the most efficient option for the beamforming in the baseband part rather than DSP or ASIC, due to its high speed, simplicity, low power consumption, and price. A Very-High Speed Integrated Circuit Hardware Description Language (VHDL) code may be developed which receives the two digitized I and Q signals from ADCs. Next, the phase shift is applied, and the shifted signals are combined and then transferred to the outputs. Similarly, the IQ data may be processed in the baseband when the channel model(s) are applied to the individual data streams for the one or more beamforming antenna(s). That is to say, the IQ data are processed by the FPGA, which applies the necessary phase shift, attenuation to the amplitude, and timing to the IQ data of one or more beamforming antennas.

Quadrature sampling is used to convert the processed signal into two digital quadrature signals, the I (in-phase) and the Q (quadrature), referred to collectively as the IQ signal. Beamforming is then performed on the IQ signal, followed by further processing.

If required, a digital representation of the radio signal may be reconstructed from the IQ data. This is accomplished through interpolation of the I and Q signals, and subsequent multiplication by a complex exponential.

Figure 7:
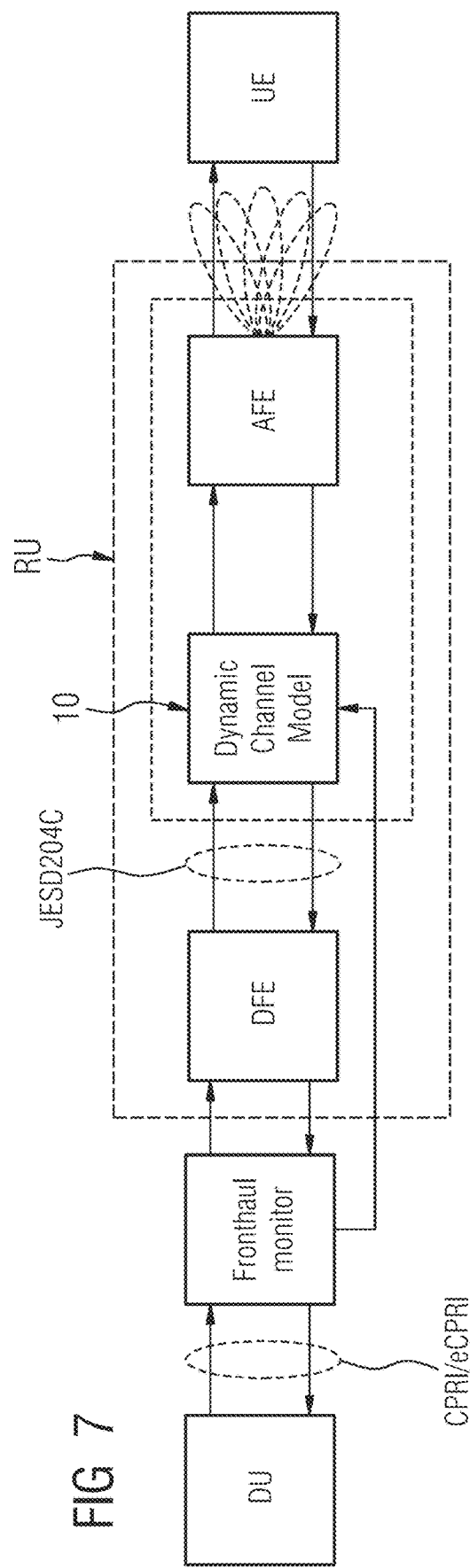
FIG. 7 depicts yet another embodiment of a test system including a test apparatus.

Turning to FIG. 7, another test system setup is shown. The test system is similar to the one shown in FIG. 6. Here however, use is made of a different functional split in which the test apparatus is inserted. As may be seen, the test apparatus is placed between the DFE and the AFE. In that case the test apparatus receives the IQ data for the one or more beamforming antennas via the JESD204B protocol. The IQ data processed according to the one or more channel models is then also transmitted by the test apparatus using the JESD204B protocol. In that case, however, a fronthaul monitor is additionally installed. The fronthaul monitor may be a tap via which the fronthaul communication is read. Using the fronthaul monitor the test apparatus may determine a beam identifier of the IQ data of the one or more beamforming antennas. Thereby, the test apparatus is capable of using information of the fronthaul protocol and selecting a channel model based on that information.

Figure 8:
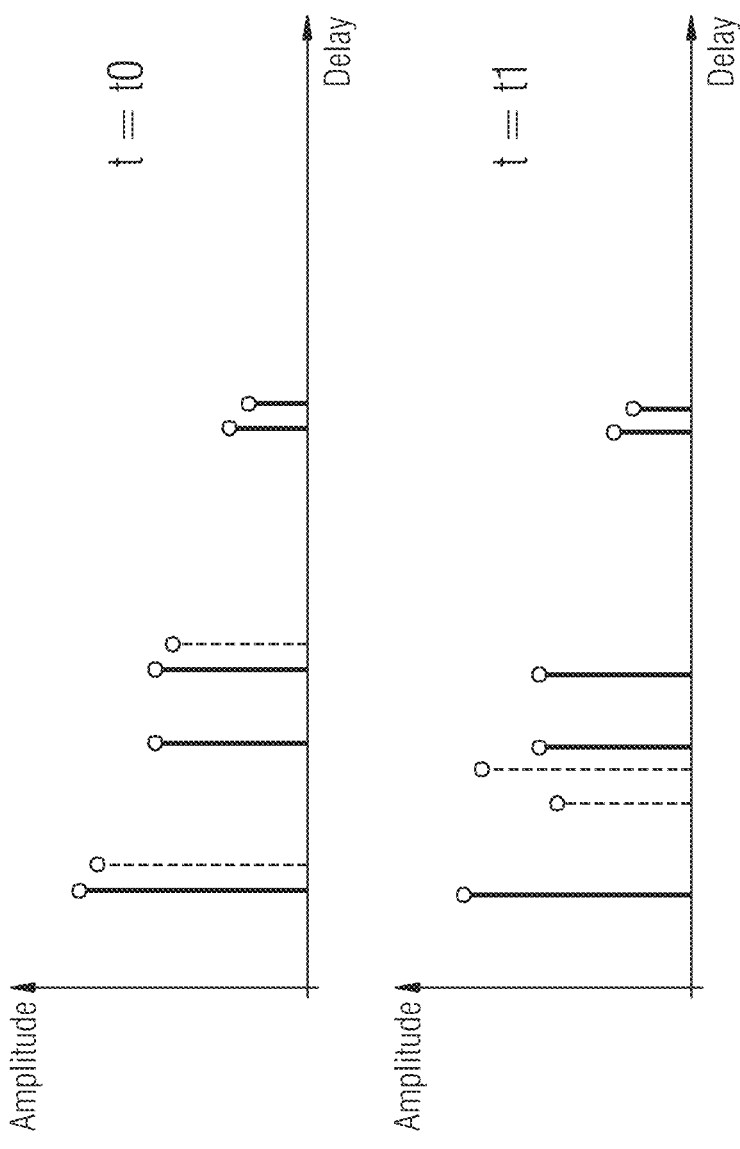
FIG. 8 depicts an example a time-varying impulse response.

FIG. 8 shows a time-varying impulse response of a radio channel, at times t0 and t1. A radio channel may be characterized by the impulse response in the time domain. In the frequency domain, the radio channel may be characterized by the channel transfer function. The test device may process Rx and/or Tx signals (in the form of IQ data) in accordance with channel model impulse response(s). The channel model, in particular, includes an impulse response in which the receiver is moving through a spatial interference pattern. Such receiver movements cause rapid changes in signal strength over a small moving distance or time interval. Further, a frequency selectivity fading may be caused by multipath propagation delays. Furthermore, frequency modulation due to varying Doppler shifts on different multipath signals may occur therein.

As shown, the impulse response (dashed lines) to the impulse input (continuous lines) changes over time. Furthermore, if a beam is switched the impulse response may change again. Hence, it is not only the environment, (e.g., by multipath propagation), speed of the receiver or the speed of the surrounding objects, that influences the radio signal propagation but also the properties of the radio beam, (e.g., signal bandwidth). As mentioned, the impulse response may be due to scattering, diffraction, and/or reflection. The channel model emulates, in particular, the fading effects on the different radio beams. Because different beams are subject to different fading effects or may be used in different environments, the channel model is changed or continuously adapted. Beam selection may be done by the DU and the test apparatus detects the change of a beam as described.

A tapped delay line (TDL) may be used to implement the channel model of an impulse response. The channel model may model a time-variant channel impulse response, (e.g., of a moving UE), by several differently weighted and delayed paths. The IQ data (stream) is passed through the channel model. The channel model attenuates, filters, and combines, as the case may be, the incoming IQ data to replicate a radio signal propagation. Via the TDL, an incoming IQ data stream is tapped at different time intervals, given amplitude weights, and then added together. The TDL may be implemented in memory. Therein, by reading and writing addresses, the delay may be controlled. For example, the incoming IQ data may be written at an address in the memory. The delay may be obtained by reading the address. In addition, amplitude attenuation may be achieved by a multiplier. The I/Q data may be written to a ring buffer memory. The "Channel model stream" as shown in FIG. 5 will control the exact point where I/Q data is read from the ring buffer. The delay is the difference between the writing and the reading address. The attenuation may be obtained by modifying the delayed IQ data stream.

Implementing the channel model and/or processing of the IQ data may be done in the frequency domain (FD). This has the benefit that FD calculations are much easier and less demanding regarding processing power and resource than time domain (TD) calculations, in particular when it comes to MIMO systems with a large amount of antennas. Furthermore, the IQ data, e.g., for the one or more antenna carriers AxC, in particular when eCPRI is used, may be in the frequency domain. Hence, a channel's impulse response may be transferred from the time domain, as shown in FIG. 8, to the frequency domain by a Fourier transformation. Hence, processing IQ data according to a channel model may result in a multiplication of the impulse response (in the frequency domain) with the frequency domain samples of the IQ data. Additionally, AWGN and multipath fading effects may be added in the frequency domain processing of the IQ data as well.

Figure 9:
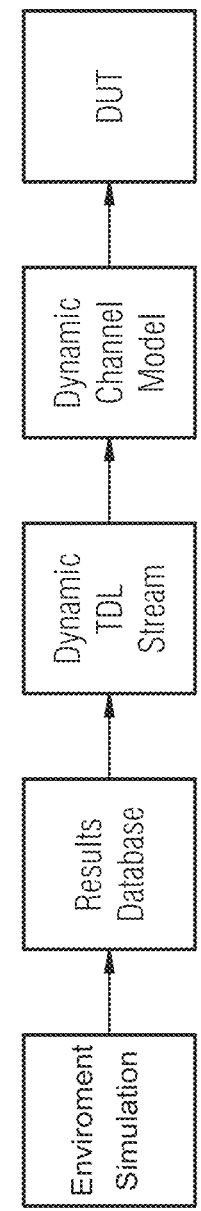
FIG. 9 depicts an example a process sequence for creating a channel model and applying the channel model to a device under test.

Turning to FIG. 9, the creation of one or more radio channel models is described. Radio signal propagation using a ray tracing method in a simulated environment is performed. To that end, the movement of a receiver is modelled by simulation. In addition, different beams may be modelled by way of the simulation. Furthermore, different environments may be modelled. By the modelling and subsequent simulation, it may also be determined whether to switch a beam, and to which beam should be switched. The results of the simulated radio signal propagation by way of a ray tracing method are then stored in a database from where they may be read and transformed into a channel model. For example, the delay and the amplitude attenuation may be extracted from the simulation, e.g., as shown in Table 7.7.2-1. TDL-A, Table 7.7.2-2. TDL-B, Table 7.7.2-3. TDL-C, Table 7.7.2-4. TDL-D and Table 7.7.2-4. TDL-E of TS38.901, Version 16.1.0, in order to construct a channel model. The channel model may then be transmitted to the test apparatus. The test apparatus may then apply the channel model to the IQ data and transmit the processed IQ data to the DUT.

Now, as for example described in O-RAN.WG2.AIML-v01.01, in particular, in Chapter 7, AI/ML Models in O-RAN Use Cases, a radio equipment may operate based on a machine learning model. For example, a DU may perform scheduling based on a machine learning model. The machine learning model may now be trained on the simulated radio signal propagation and/or the channel models created. In order to provide sufficient training data for the machine learning model the radio equipment operates with, the simulated environment may be adapted, and the changed radio signal propagation may be used for training the machine learning model. On the other hand, the data obtained by simulating a, (e.g., indoor), environment may be used to test the functioning of the machine learning model. Hence, the processed baseband signal representing IQ data may serve for training and/or testing the machine learning model of the radio equipment.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of generating test data for testing radio equipment, the method comprising:
    determining, by a test apparatus, one or more beam identifiers;
    selecting, by the test apparatus, one or more radio channel models based on the one or more beam identifiers, wherein the test apparatus positioned between a radio unit and a distributed unit reads a fronthaul communication and selects the one or more radio channel models based on the one or more beam identifiers transmitted from the distributed unit;
    receiving, by the test apparatus, a baseband signal representing In-phase and Quadrature components (I/Q) data of one or more beamforming antennas;
    processing, by the test apparatus, the baseband signal representing I/Q data according to the selected one or more radio channel models, wherein the one or more radio channel models are applied in the fronthaul communication by processing the I/Q data transmitted over the fronthaul communication between the distributed unit and the radio unit; and
    transmitting, by the test apparatus, the processed baseband signal representing the I/Q data to a radio equipment under test.

2. The method of claim 1, further comprising:
    performing digital beamforming by the test apparatus.

3. The method of claim 1, wherein the distributed unit controls usage of beams by transmitting the one or more beam identifiers, such as a beam index, via a fronthaul protocol to the radio unit.

4. The method of claim 1, wherein the I/Q data transmitted over the fronthaul communication corresponds to antenna carrier streams, and
    wherein a separate radio channel model of the one or more radio channel models is applied to each antenna carrier stream of the antenna carrier streams.

5. The method of claim 1, wherein the test apparatus processes a first protocol by which an I/Q data stream is received and outputs the I/Q data stream via a second protocol, and
    wherein the first and the second protocol coincide or are different protocols.

6. The method of claim 1, wherein the determining of the one or more beam identifiers comprises:
    monitoring the fronthaul communication, such as an enhanced Common Public Radio Interface (eCPRI) payload of one or more control plane messages from the distributed unit to the radio unit; and
    identifying the one or more beam identifiers based on the fronthaul communication monitored.

7. The method of claim 1, wherein the selecting of the one or more radio channel models comprises:
    changing the one or more radio channel models when the one or more beam identifiers change.

8. The method of claim 1, wherein the one or more radio channel models are based on a simulation of one or more radio channels, and
    wherein the simulation of the one or more radio channels is based on a ray tracing method of an indoor environment.

9. The method of claim 1, wherein the one or more radio channel models are one or more dynamic channel models transformed continuously by continuously adapting channel model parameters by interpolating one or more impulse responses of one or more beams corresponding to the one or more beam identifiers.

10. The method of claim 1, wherein the radio equipment under test is a radio equipment that operates based on a machine learning model, and
    wherein the processed baseband signal representing the I/Q data serves for training the machine learning model of the radio equipment under test.

11. The method of claim 1, wherein, for a same radio channel model, beam sweeping is performed periodically in order to identify an optimal beam.

12. A test apparatus for generating test data for testing radio equipment, wherein the test apparatus is configured to:
    determine one or more beam identifiers;
    select one or more radio channel models based on the one or more beam identifiers, wherein the test apparatus, when positioned between a radio unit and a distributed unit, is configured to read a fronthaul communication and select the one or more radio channel models based on the one or more beam identifiers transmitted from the distributed unit;
    receive a baseband signal representing In-phase and Quadrature components (I/Q) data of one or more beamforming antennas;
    process the baseband signal representing I/Q data according to the selected one or more radio channel models; and
    transmit the processed baseband signal representing the I/Q data to a radio equipment under test.

13. The test apparatus of claim 12, wherein the test apparatus is configured to apply the one or more radio channel models in the fronthaul communication by processing the I/Q data transmitted over the fronthaul communication between the distributed unit and the radio unit.

14. The test apparatus of claim 12, wherein the test apparatus is configured to perform digital beamforming.

15. The test apparatus of claim 12, wherein the distributed unit controls usage of beams by transmitting the one or more beam identifiers, such as a beam index, via a fronthaul protocol to the radio unit.

16. The test apparatus of claim 12, wherein the I/Q data transmitted over the fronthaul communication corresponds to antenna carrier streams, and
    wherein a separate radio channel model of the one or more radio channel models is applied to each antenna carrier stream of the antenna carrier streams.

17. The test apparatus of claim 12, wherein the test apparatus is configured to process a first protocol by which an I/Q data stream is received and output the I/Q data stream via a second protocol, and
    wherein the first and the second protocol coincide or are different protocols.

18. The test apparatus of claim 12, wherein the test apparatus is configured to:
    monitor the fronthaul communication, such as an enhanced Common Public Radio Interface (eCPRI) payload of one or more control plane messages from the distributed unit to the radio unit; and
    identify the one or more beam identifiers based on the fronthaul communication monitored.

19. The test apparatus of claim 12, wherein the test apparatus is configured to change the one or more radio channel models when the one or more beam identifiers change.

20. The test apparatus of claim 12, wherein the one or more radio channel models are based on a simulation of one or more radio channels, and
    wherein the simulation of the one or more radio channel is based on a ray tracing method of an indoor environment.

21. The test apparatus of claim 12, wherein the test apparatus is configured to transform the one or more radio channel models continuously by continuously adapting channel model parameters by interpolating one or more impulse responses of one or more beams.

22. A system comprising:
    a test apparatus; and
    a radio equipment configured to operate based on a machine learning model,
    wherein the test apparatus is configured to:
        determine one or more beam identifiers;
        select one or more radio channel models based on the one or more beam identifiers, wherein the test apparatus, when positioned between a radio unit and a distributed unit, is configured to read a fronthaul communication and select the one or more radio channel models based on the one or more beam identifiers transmitted from the distributed unit;
        receive a baseband signal representing In-phase and Quadrature components (I/Q) data of one or more beamforming antennas;
        process the baseband signal representing the I/Q data according to the selected one or more radio channel models; and
        transmit the processed baseband signal representing the I/Q data to the radio equipment, and
    wherein the processed baseband signal representing the I/Q data is configured to train the machine learning model of the radio equipment.

23. The system of claim 22, wherein the radio equipment is configured to perform a beam sweeping for a same radio channel model in order to identify an optimal radio beam.

* * * * *